United States Patent [19]

Hatch

[11] 3,859,210

[45] Jan. 7, 1975

[54] REMOVAL OF HEAVY METALS FROM AQUEOUS SOLUTIONS

[76] Inventor: Asa E. Hatch, 118 Post Oak, Lake Jackson, Tex. 77566

[22] Filed: July 19, 1971

[21] Appl. No.: 164,151

[52] U.S. Cl.................. 210/28, 210/38, 210/51, 210/54
[51] Int. Cl............... C02b 1/14, C02c 5/02
[58] Field of Search............ 210/24, 28, 38, 41, 43, 210/50–54, 42

[56] References Cited
UNITED STATES PATENTS

| | | | |
|---|---|---|---|
| 2,280,812 | 4/1942 | Ellis | 210/41 |
| 2,362,022 | 11/1944 | Olin | 210/43 |
| 3,342,742 | 9/1967 | Cocks et al. | 210/52 X |
| 3,352,424 | 11/1967 | Guebert et al. | 210/51 X |
| 3,375,202 | 3/1968 | Laveissiere et al. | 210/38 X |
| 3,433,738 | 3/1969 | Black et al. | 210/54 |
| 3,511,778 | 5/1970 | Libor et al. | 210/53 X |
| 3,575,852 | 4/1971 | Hughes | 210/51 X |
| 3,753,901 | 8/1973 | Taubman et al. | 210/54 X |

Primary Examiner—Thomas G. Wyse
Attorney, Agent, or Firm—Herbert D. Knudsen

[57] ABSTRACT

Heavy metals dissolved in aqueous streams are removed by contacting the aqueous stream with a polyelectrolyte in the presence of particulate matter, allowing the heavy metal to be bound to the particulate matter and separating the particulate matter containing the heavy metal from the aqueous stream, thereby purifying it.

7 Claims, No Drawings

REMOVAL OF HEAVY METALS FROM AQUEOUS SOLUTIONS

BACKGROUND OF THE INVENTION

The alarm caused by the discovery of substantial amounts of heavy metals in aqueous streams and the discovery that these heavy metals can be detrimental to human and animal health has spurred an intensive search for methods of coping with heavy metal pollution. The present invention is the result of such a search.

Techniques for treating water which are similar to the present invention and polyelectrolytes suitable for use in such treatment are known, see for example Pye and Schurz in U.S. Pat. No. 3,128,249; Nagan in U.S. Pat. No. 3,131,144; Weidner and Dunlap in U.S. Pat. No. 2,995,512; Guebert and Laman in U.S. Pat. No. 3,242,073 and Hatch in U.S. Pat. No. 3,483,120. The references, however, do not teach that heavy metals can be removed from aqueous streams by use of the techniques of the present invention.

SUMMARY OF THE INVENTION

It has now been discovered in the present invention that heavy metals can be removed from aqueous streams having dissolved therein at least one heavy metal ion or compound by (1) contacting the aqueous stream with a cationic, anionic or nonionic polyelectrolyte in the presence of particulate matter, (2) allowing the heavy metal to be bound to the particulate matter and (3) separating the particulate matter containing the heavy metal from the purified aqueous stream. By this process, the concentration of heavy metals can be substantially reduced or eliminated even when the heavy metals are present in very dilute concentrations.

The aqueous stream treated by the techniques of the present invention may vary widely in terms of source and composition. The basic qualifying factor is that the fluid must contain at least one heavy metal ion or compound. Preferred in the invention is the treatment of aqueous streams that contain dissolved iron, nickel, chromium, zinc, titanium, tin, copper and mercury, with the removal of mercury from the aqueous stream being of greatest interest.

As noted, the heavy metal dissolved in the aqueous stream may be an ion or it may also be in the form of another soluble compound such as an organometallic compound. The removal of metal ions, however, is preferred because of the special effectiveness of the techniques of the present invention in this application.

The concentration of the heavy metal in the aqueous stream may vary widely. One of the suprising discoveries of the present invention is that the techniques of the invention can be employed to remove heavy metals from aqueous streams containing a few parts per billion of heavy metal. This is advantageous, for most heavy metal pollution is found in very dilute concentrations in the environment. No practical economic method of removing these low concentrations of metals is known. In the preferred practice of the present invention, aqueous streams wherein the concentration of any one of the heavy metals is not in excess of about 2 p.p.m. are treated.

The central aspect of the present invention is contacting the aqueous stream with a polyelectrolyte and particulate matter at the same time. This is conveniently accomplished by adding either one of the two components first and then adding the second or by simultaneously adding both components.

The polyelectrolyte used in the present invention may suitably be cationic, anionic or nonionic. Such polyelectrolytes are more fully described in the references cited in the Background of the Invention. Preferred in the present invention are polyalkylene polyamines and polyalkylenimines, with polyethylenimine being of greatest interest.

The particulate matter may be any substance which is compatible with the polyelectrolyte, which binds the heavy metal ion in the process of the invention and which is easily separated from the aqueous stream. Representative examples of such forms of particulate matter include sand, clay, infusorial earth and fullers' earth. Preferred in the present invention because of their proven effectiveness and low cost are sand and clay.

After the first step of the process which involves contacting the aqueous stream with the polyelectrolyte in the presence of particulate matter, two steps remain. These steps are necessary for the successful operation of the process but are generally carried out by known techniques. The second step involves allowing the aqueous stream to be in contact with the polyelectrolyte and particulate matter for a time sufficient to bind the heavy metal to the particulate matter. The time required for this operation depends upon the nature and concentration of the heavy metals, upon the conditions of the removal and upon the polyelectrolyte and particulate matter employed. The time required for this step may be reduced by increasing the contact of the aqueous stream with the polyelectrolyte and particulate matter. This is conveniently accomplished by stirring.

The third step involves a conventional separation where the particulate matter is separated from the aqueous stream. This is conveniently accomplished by simple filtration using a filter aid or by continuously treating and filtering a flowing stream of contaminated water.

Using the techniques of the present invention, heavy metals are conveniently and effectively removed from aqueous streams even when the concentration of the metal contaminant is only a few parts per billion.

SPECIFIC EMBODIMENTS

EXAMPLE 1 — REMOVAL OF METALS FROM SEA WATER

300 Grams of dry sand and 150 g. of a 33% aqueous solution of polyethylenimine (PEI) were mixed thoroughly and dried at 80° C. for 4 hours. The dried mixture was placed in a porous cloth sack and immersed in flowing sea water for 104 hours. The results of this test showing the concentration of the metal in sea water, the concentration of the heavy metal in the sand-PEI mixture before and after exposure to sea water and the amount of heavy metals removed from sea water are found in Table I.

TABLE I

Removal of Heavy Metals from Sea Water

| Metal Component | Concentration of Metal, p.p.m. | | | Heavy Metal Removed, p.p.m.* |
|---|---|---|---|---|
| | Sea Water | Sand-PEI Mixture | | |
| | | Before | After | |
| Fe | 0.01 | 1750 | 3200 | 1450 |
| Ni | 0.002 | 6 | 55 | 49 |
| Cr | 0.00005 | 3 | 12 | 9 |
| Zn | 0.01 | 13 | 14 | 1 |
| Ti | 0.001 | 80 | 110 | 30 |
| Sn | 0.003 | <5 | 40 | 35 |
| Cu | 0.003 | 10 | 26 | 16 |

*Based on the weight of the Sand-PEI mixture.

It can be seen from the results in Table I that heavy metals were effectively removed even when the concentration of the metal is as low as five-hundredths of one part per billion as is shown for chromium.

EXAMPLE 2 — REMOVAL OF MERCURY ION

To waste water containing 0.11 p.p.m. mercuric ion, 2.0 p.p.m. of polyalkylene polyamine sold under the trademark Purifloc C-31 and having a molecular weight of about 40,000 were added. After the addition of the polyelectrolyte, 1,000 p.p.m. of bentonite clay was added, the mixture was stirred 10 minutes and filtered through diatomaceous earth. The mercury concentration in the purified stream was less than 2 parts per billion as compared to the original concentration of 0.11 p.p.m. Filtration of the aqueous stream through diatomaceous earth only without other treatment gave a final mercury concentration of 28 parts per billion; treatment with clay and filtration gave essentially the same results as filtration alone. Thus, the treatment of the invention is substantially superior to simple filtration or to clay treatment and filtration.

In the same manner as described by the examples above, other polyelectrolytes, such as polyacrylamide, polyvinylbenzyltrimethyl ammonium chloride and an alkylene polyamine halohydrin polymer, are used in combination with sand or clay to remove heavy metals from aqueous streams.

I claim:

1. A process for removing mercury from aqueous streams having dissolved therein mercury in ionic or compound form comprising
   1. contacting the aqueous stream with a polyelectrolyte selected from the group consisting of a polyalkylene polyamine and polyethylenimine and particulate matter selected from the group consisting of a bentonite clay and sand,
   2. allowing the mercury to be bound to the particulate matter, and
   3. separating the particulate matter containing the mercury from the aqueous stream.

2. The process of claim 1 wherein mercury ions are removed.

3. The process of claim 1 wherein the concentration of the mercury is not in excess of about 2 p.p.m.

4. The process of claim 1 wherein the polyelectrolyte is polyethylenimine.

5. The process of claim 1 wherein mercury ion is removed from an aqueous stream using a polyalkylene polyamine and a bentonite clay.

6. A process for removing mercury from aqueous streams having dissolved therein mercury in ionic form comprising
   1. contacting with stirring the aqueous stream with a polyalkylene polyamine and a bentonite clay,
   2. allowing the mercury to be bound to the bentonite clay, and
   3. separating by filtration the bentonite clay containing the aqueous mercury from the aqueous stream.

7. The process of claim 6 wherein the concentration of the mercury is not in excess of about 2 p.p.m.

* * * * *